US006766155B2

(12) United States Patent
Salcido et al.

(10) Patent No.: US 6,766,155 B2
(45) Date of Patent: Jul. 20, 2004

(54) FIXED TERMINATION SCHEME FOR DIFFERENTIAL RECEIVER THAT COMPENSATES FOR PROCESS, VOLTAGE, AND TEMPERATURE VARIATIONS

(75) Inventors: Manuel Salcido, Fort Collins, CO (US); Salvador Salcido, Jr., Albany, OR (US); Scott T. Evans, Ft. Collins, CO (US); Gilbert Yoh, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 413 days.

(21) Appl. No.: 10/056,164

(22) Filed: Jan. 24, 2002

(65) Prior Publication Data

US 2003/0139164 A1 Jul. 24, 2003

(51) Int. Cl.[7] ................................................. H04B 1/18
(52) U.S. Cl. ........................ 455/282; 455/281; 327/108
(58) Field of Search ................................. 455/282, 295, 455/283, 291, 293, 296, 130, 280–281; 327/108, 93, 63, 319, 408; 326/82, 30; 325/252, 2; 333/32, 33, 124

(56) References Cited

U.S. PATENT DOCUMENTS

| | | | | |
|---|---|---|---|---|
| 5,541,554 A | * | 7/1996 | Stengel et al. | 330/51 |
| 5,550,496 A | | 8/1996 | Desroches | |
| 5,559,471 A | * | 9/1996 | Black | 330/277 |
| 5,684,429 A | * | 11/1997 | Sanwo et al. | 327/563 |
| 5,726,582 A | * | 3/1998 | Hedberg | 326/30 |
| 5,822,685 A | * | 10/1998 | Forster | 455/106 |
| 6,236,695 B1 | * | 5/2001 | Taylor | 375/372 |
| 6,294,942 B2 | * | 9/2001 | Bertin et al. | 327/327 |
| 6,337,586 B2 | * | 1/2002 | Aizawa | 327/108 |
| 6,373,300 B2 | * | 4/2002 | Welch et al. | 327/112 |
| 6,404,223 B1 | * | 6/2002 | Degerstrom et al. | 326/30 |
| 6,462,588 B2 | * | 10/2002 | Lau et al. | 327/108 |
| 6,490,325 B1 | * | 12/2002 | Fiedler et al. | 375/257 |
| 6,509,765 B1 | * | 1/2003 | Drost | 327/112 |
| 6,525,559 B1 | * | 2/2003 | Wu et al. | 326/30 |
| 6,590,413 B1 | * | 7/2003 | Yang | 326/30 |
| 6,664,804 B2 | * | 12/2003 | Nakada et al. | 326/21 |

OTHER PUBLICATIONS

Ethirajan, Karthik; Nemec, John; "Termination techniques for High–Speed Buses", Feb. 16, 1998, pp. 1–9.
"High Speed Tranceiver Logic (HSTL) A 1.5V OUtput Buffer Supply Voltage Based Interface Standard for Digital Integrated Circuits", EIA/JEDEC Standard, Aug. 1995, pp. 2–14.

* cited by examiner

*Primary Examiner*—Pablo N. Tran

(57) ABSTRACT

A novel terminating differential bus receiver with automatic compensation for process, voltage, and temperature variation is presented. A termination circuit is connected internal to the integrated circuit to the input of a differential receiver in parallel with a transmission line connectable to the receiver. Both the termination circuit and the differential receiver are implemented with at least one p-channel transistor and at least one n-channel transistor, such that the p-channel transistors of the termination circuit and receiver and the n-channel transistors of the termination circuit and receiver are ratioed to vary similarly under PVT variation.

14 Claims, 5 Drawing Sheets

FIXED TERMINATION SCHEME FOR DIFFERENTIAL RECEIVER THAT COMPENSATES FOR PROCESS, VOLTAGE, AND TEMPERATURE VARIATIONS

FIELD OF THE INVENTION

The present invention relates generally to transmission line termination techniques for integrated circuits, and more particularly to a novel terminating differential receiver which provides automatic adjustment to compensate for process, voltage, and temperature variations of the integrated circuit.

BACKGROUND OF THE INVENTION

As integrated circuits become increasingly faster, integrated circuit designers are faced signal quality concerns that have previously been relegated to the analog world. At very high speeds, circuit board traces, and in some applications even the packaging interconnects between the die pad and the circuit board trace, behave like transmission lines. Because the transmission of signal occurs using analog technology, the transition between digital states does not occur instantaneously, but instead occurs over a period of time that is dependent on the transmission line characteristics. It is well known that signal transitions over a transmission line will suffer propagation delay due to the parasitic resistance, inductance, and capacitance of the line. Propagation delay increases with the length of the line. In addition, it is also well-known that unless the impedance of the transmission line matches that of the load it drives, the signal will degrade due to reflections caused by impedance mismatching. Reflections occur at all points on the circuit board trace where impedance mismatches exist.

Signal reflections produce or contribute to a number of problems, including false triggering in clock lines, erroneous bits on data, address, and control lines, clock and signal jitter, and an increase in total emissions from the pc board. An effective way to reduce these transmission-line effects is to properly terminate the lines.

Various transmission line termination techniques exist, including parallel, series, Thevenin, AC or diode-based termination. The selected termination technique may vary depending on the application technology.

In prior art termination schemes, the transmission line is terminated external to the integrated circuit—that is, the termination resistors/capacitors are electrically connected to the input/output pads of the integrated circuit on the printed circuit board. External termination is problematic because the actual termination resistors/capacitors may not be positionable within close proximity to the signal's final destination (i.e., the receiver). The redistribution metal required for interconnection between the receiver inside the integrated circuit and the transmission line on the printed circuit board is characterized by its own parasitics which can alter the true termination requirements for the line and contribute to reflection noise.

Another problem faced by bus designers is variation between integrated circuits in manufacturing process, chip temperature, or voltage levels (known as "PVT variation"). PVT variation can cause performance differences across identically designed integrated circuits, and in sensitive applications requires additional compensation circuitry to account for the PVT variation.

In view of the above, a need exists for an improved bus termination technique that also allows for termination impedance adjustment to compensate for PVT variation.

SUMMARY OF THE INVENTION

The present invention is a novel terminating differential receiver that includes automatic adjustment to compensate for PVT variation without requiring additional PVT compensation circuitry.

In accordance with the invention, a terminating differential receiver for an integrated circuit includes a transmission line terminating impedance circuit located within the integrated circuit itself in close proximity to the input of the receiver. By positioning the terminating circuit within the integrated circuit itself, this termination technique significantly reduces signal reflection by accounting for the parasitic capacitance resulting from the internal interconnect between the receiver and the transmission line.

In addition to the improved termination technique, the terminating receiver affords the added benefit of tracking the optimal common-mode performance range to the PVT variations of the chip to shift the DC value of the transmission line in the same direction of the optimal DC operating point of the receiver. Accordingly, the differential receiver automatically adjusts to its optimal performance range without requiring additional PVT compensation circuitry.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

An improved bus termination technique with built-in PVT compensation is described in detail hereinafter. Although the invention is described in terms of specific illustrative embodiments using specific logic standards (HSTL) and receiver designs, it is to be understood that the embodiments described herein are by way of example only and that the scope of the invention is not intended to be limited thereby.

Figure 1:
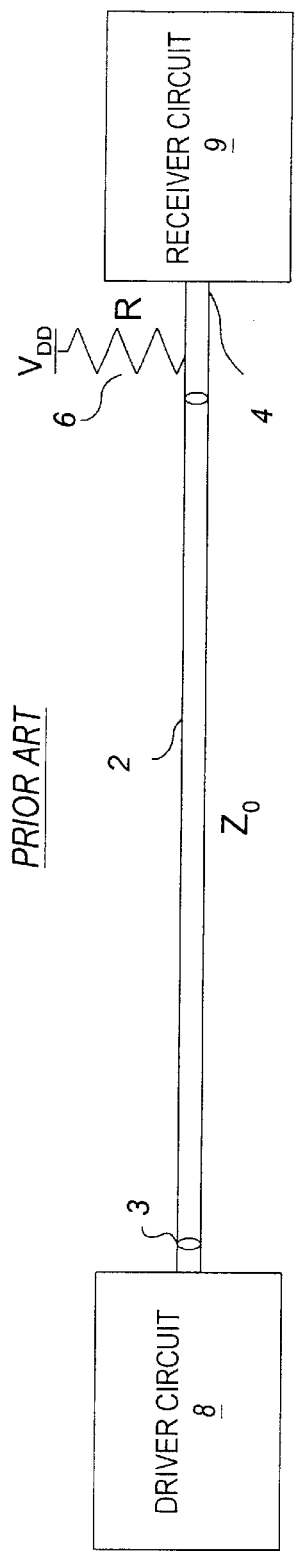
FIG. 1 is a block diagram of a conventional parallel transmission line termination scheme.

Turning now to FIG. 1, there is shown a block diagram illustrating a conventional parallel terminated transmission line 2. As known in the art, parallel termination comprises a resistor 6 connected from the load end 4 of the line 2 to $V_{DD}$ (as shown) or ground (not shown). The value R of the resistor 6 must match the characteristic impedance, $Z_0$, of the line 2 to eliminate reflections. If R matches $Z_0$, the termination resistor 6 absorbs the energy that causes the reflection.

Figure 2:
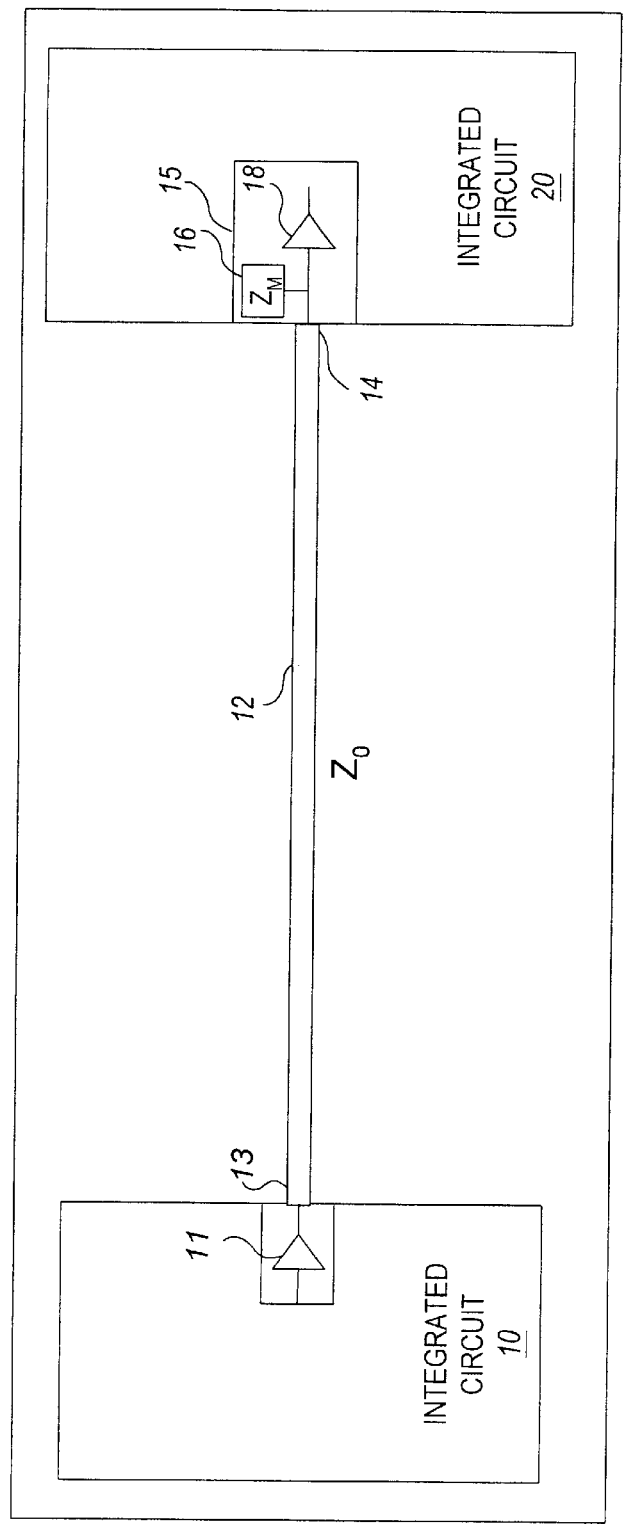
FIG. 2 is a block diagram of a transmission line connected to a terminating receiver in accordance with the invention.

Turning now to the invention, FIG. 2 depicts a block diagram of a transmission line 12 connected between a driver circuit 11 of a first integrated circuit 10 and a terminating receiver circuit 15 of a second integrated circuit 20. In this configuration, terminating receiver circuit 15 is the load. In accordance with the invention, terminating receiver circuit 15 includes a receiver circuit 18 and a termination circuit 16. Termination circuit 16 is connected at the input of (or in close proximity to) the receiver circuit 18. Importantly, the termination circuit 16 is implemented within the integrated circuit 20 itself and in very close proximity to the receiver circuit 18. The termination circuit 16 provides a matching termination impedance $Z_M$ that matches the characteristic impedance $Z_0$ of the transmission line 12. By locating the matching termination impedance $Z_M$ in parallel with the termination line 12 in very close proximity to the receiver circuit 18, signal reflections by the receiver circuit 18 can be eliminated or significantly reduced.

Figure 3:
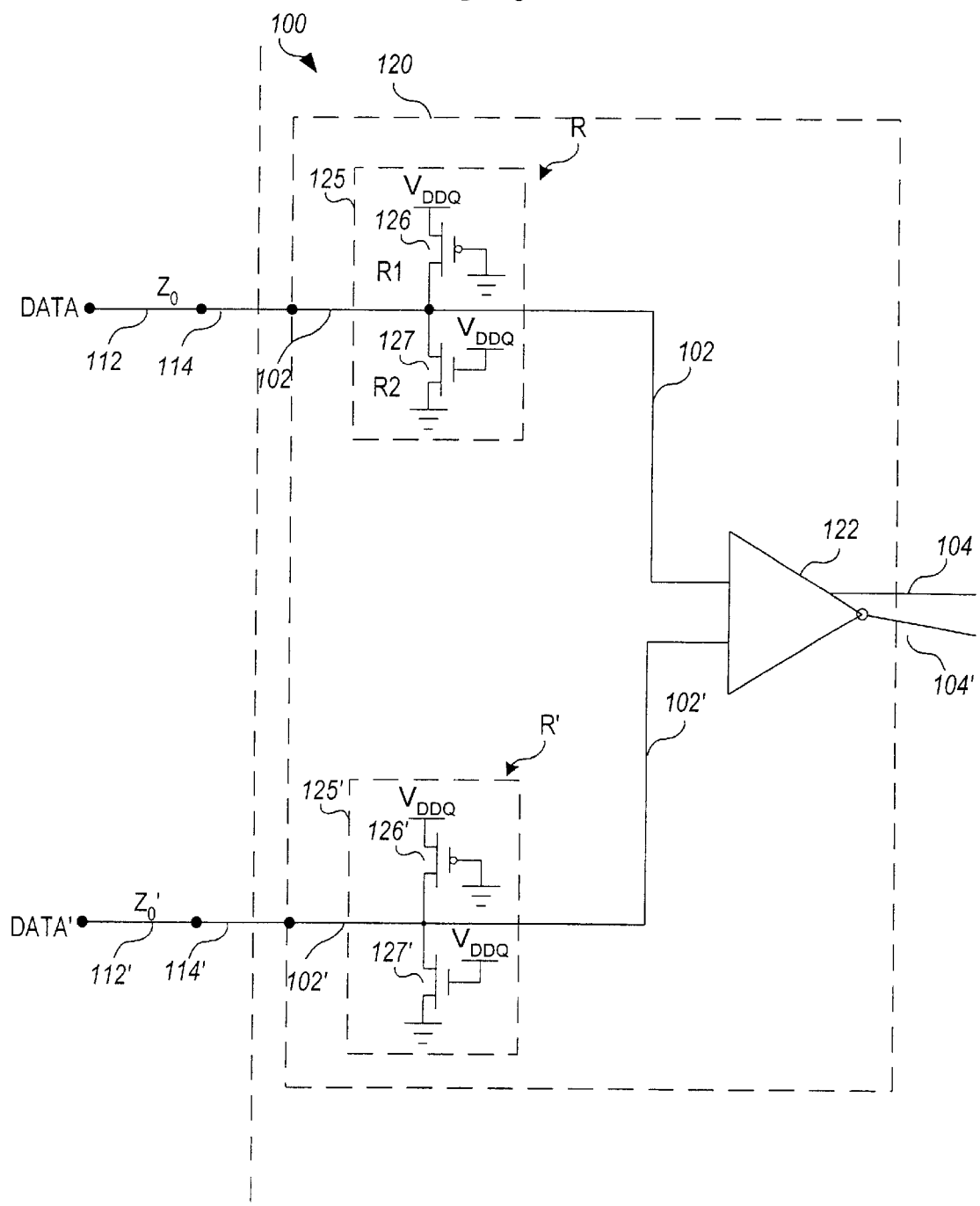
FIG. 3 is a schematic block diagram of a terminating receiver circuit in accordance with the invention.

FIG. 3 is a schematic block diagram of a portion of an integrated circuit 100 comprising a terminating receiver circuit 120 in accordance with the invention. As shown, terminating receiver circuit 120 is implemented within integrated circuit 100 and receives differential (opposite polarity) input signals DATA and DATA' on respective differential input lines 102 and 102'. The differential input lines 102 and 102' are respectively connected to differential transmission lines 112, 112' through printed circuit board (PCB) connections 114, 114' (e.g., pins, tables, flip-chip connections, etc.) of the integrated circuit 100.

In the preferred embodiment, the receiver circuit 122 is a differential receiver 122 complying with the IEEE EIA/JEDEC Standard, JESD8-6 High Speed Transceiver Logic (HSTL). As known in the industry, the JESD8-6 standard is a 1.5 Volt output buffer supply voltage based interface standard for digital integrated circuits.

Figure 4:
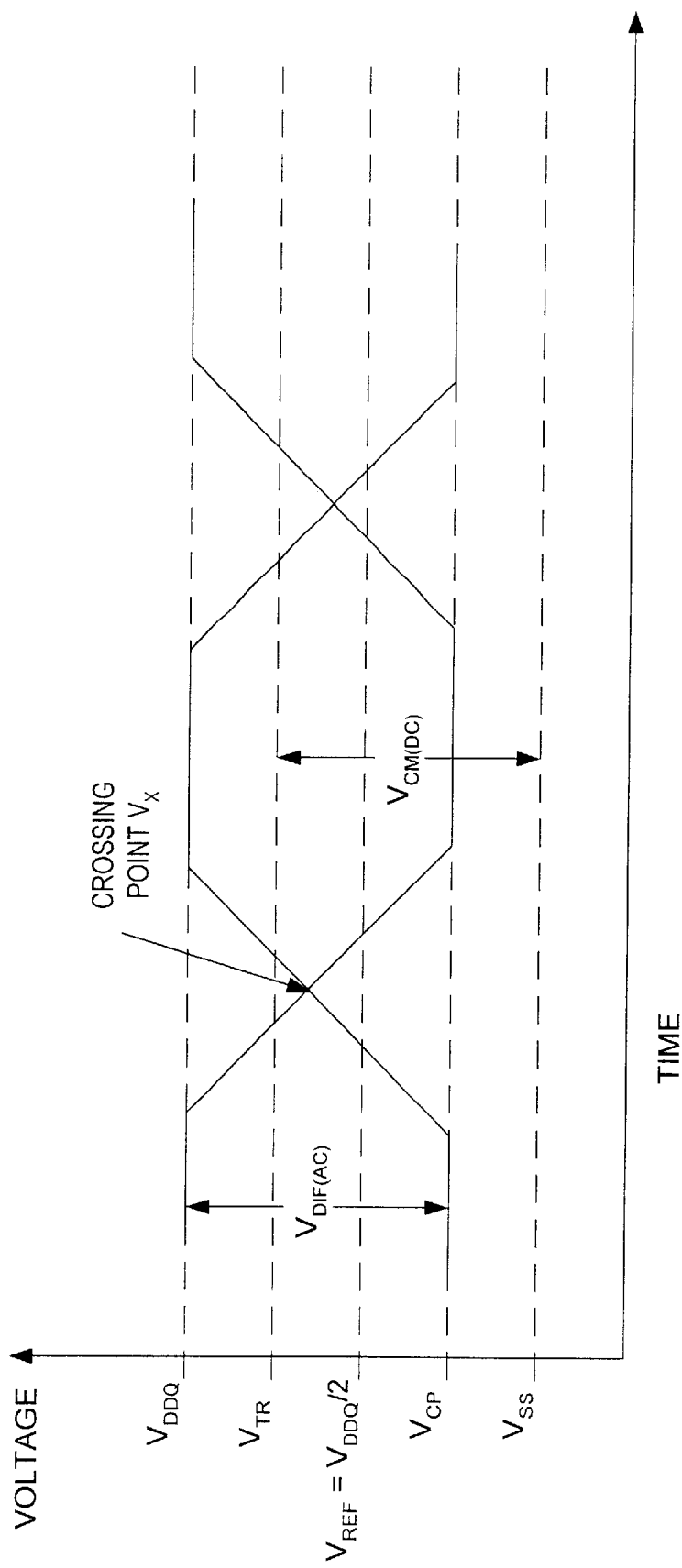
FIG. 4 is a signal specification diagram for the HSTL standard.

FIG. 4 is a signal level diagram illustrating the HSTL voltage level specifications for a transitioning signal. As illustrated, the differential receiver is compliant with the HSTL standard if the nominal voltage level $V_{REF}$ of the input signal DATA/DATA' is 0.68 V up to 0.90 V, and preferably having a nominal level of 0.75 V. $V_{REF}$ is generally $V_{DDQ}/2$, where $V_{DDQ}$ is the output power supply of approximately 1.5 V (which may be different from those that operate the integrated circuit ($V_{DD}$, typically 2.5 to 3.3 V)). The peak-to-peak output voltage is nominally 1.5 V and must be no less than 1.4 V and no greater than 1.6 V.

The differential input parameters defined according to the HSTL standard mandate that the DC common mode input voltage $V_{CM(DC)}$ is 0.68 V to 0.90 V, and nominally 0.75 V. The AC differential input voltage $V_{DIF(AC)}$ has a minimum value of 0.40 V and a maximum value of $V_{DDQ}$+0.60 V, where $V_{DIF(AC)}$ specifies the minimum input differential voltage ($V_{TR}$-$V_{CP}$) required for switching where $V_{TR}$ is the "true" input signal and $V_{CP}$ is the "complement" input signal. The differential cross point voltage $V_X$ must be between 0.68 V and 0.90 V inclusive, where $V_X$ indicates the voltage at which the differential input signals must cross.

Referring back to FIG. 3, terminating receiver circuit 120 comprises respective termination circuits 125, 125' connected to respective differential input lines 102 and 102'. Termination circuits 125, 125' are connected in parallel with respective transmission lines 112, 112' through interconnects 114, 114' respectively. Typically, the printed traces on a circuit board are treated as transmission lines. However, depending on the speed of the integrated circuit, the package interconnects may or may not be treated as transmission lines as well. Each termination circuit 125, 125' implements an impedance $Z_M$, $Z_M'$ that respectively matches the characteristic impedance $Z_0$, $Z_0'$ of respective transmission lines 112, 112', adjusted to account for the contributing parasitics of interconnects 114.

In the preferred embodiment, the termination circuit 125, 125' is a Thevenin termination circuit that comprises two resistive devices 126 and 127 or 126' and 127' having respective resistance values $R_1$ and $R_2$ whose parallel combination matches the characteristic impedance $Z_0$ of the line. The Thevenin voltage, $V_{TH}$=$V_{R2}$, must be such that the receiver's input high and low currents $I_{IH}$ and $I_{IL}$ are within the logic standard's specifications. $R_1$ helps the driver to easily pull up to a logic-high state by sourcing some current to the load. Similarly, $R_2$ helps the driver to pull down to a logic-low state by sinking some current to ground. The advantages of Thevenin termination are that the termination resistors also serve as pullup and pulldown resistors and thereby improve the noise margin of the system. Thevenin termination also reduces the burden on the driver by supplying additional current to the load and provides good overshoot suppression.

In the illustrative embodiment, termination circuits 125, 125' implement an active termination scheme with field effect transistors PFET 126 and NFET 127, and PFET 126' and NFET 127' respectively. In compliance with the HSTL specification, the FETs 126, 127, 126', 127' are sized to charge the transmission lines 112, 112' to a nominal input voltage of $V_{DDQ}/2$ when lines 112, 112' are not actively driven (i.e., are "floating"). The differential receiver 122 is tuned for optimal differential-mode operation in the nominal case with a crossing point at $V_{DDQ}/2$ (0.75 V).

For illustration, assuming a transmission line characteristic impedance $Z_O$ of 50 Ohms, the Thevenin input resistance $R_{TH}$ of the terminating receiver circuit 120 looking in must also be 50 Ohms. Because FET devices are non-linear, in order to supply the current required to be in compliance with the HSTL receiver specifications, the FETs must be sized accordingly. In the preferred embodiment, FETs 126 and 127, and 126' and 127' are sized such that the resistances $R_1$ and $R_2$ are each matched to approximately 50 ohms at $V_{DDQ}/2$. Preferably, all PFETs and NFETs in both the termination circuit 125, 125' and differential receiver 122 are sized to have the same transistor gate lengths in order to result in similar PVT variation.

In contrast to prior art termination techniques, the invention uniquely employs transistors (FETS) in an active termination scheme. FETs are not conventionally used to terminate transmission lines due to their susceptibility to PVT variations and resulting interference with ideal termination of the line. However, by employing the active termination within a differential receiver and using the same gate length for all PFETs and the same gate length for all NFETs in both the termination circuits 125, 125' and the differential receiver 122, the differential receiver's common mode optimal performance range will track the performance shift due to PVT variations.

Figure 5:
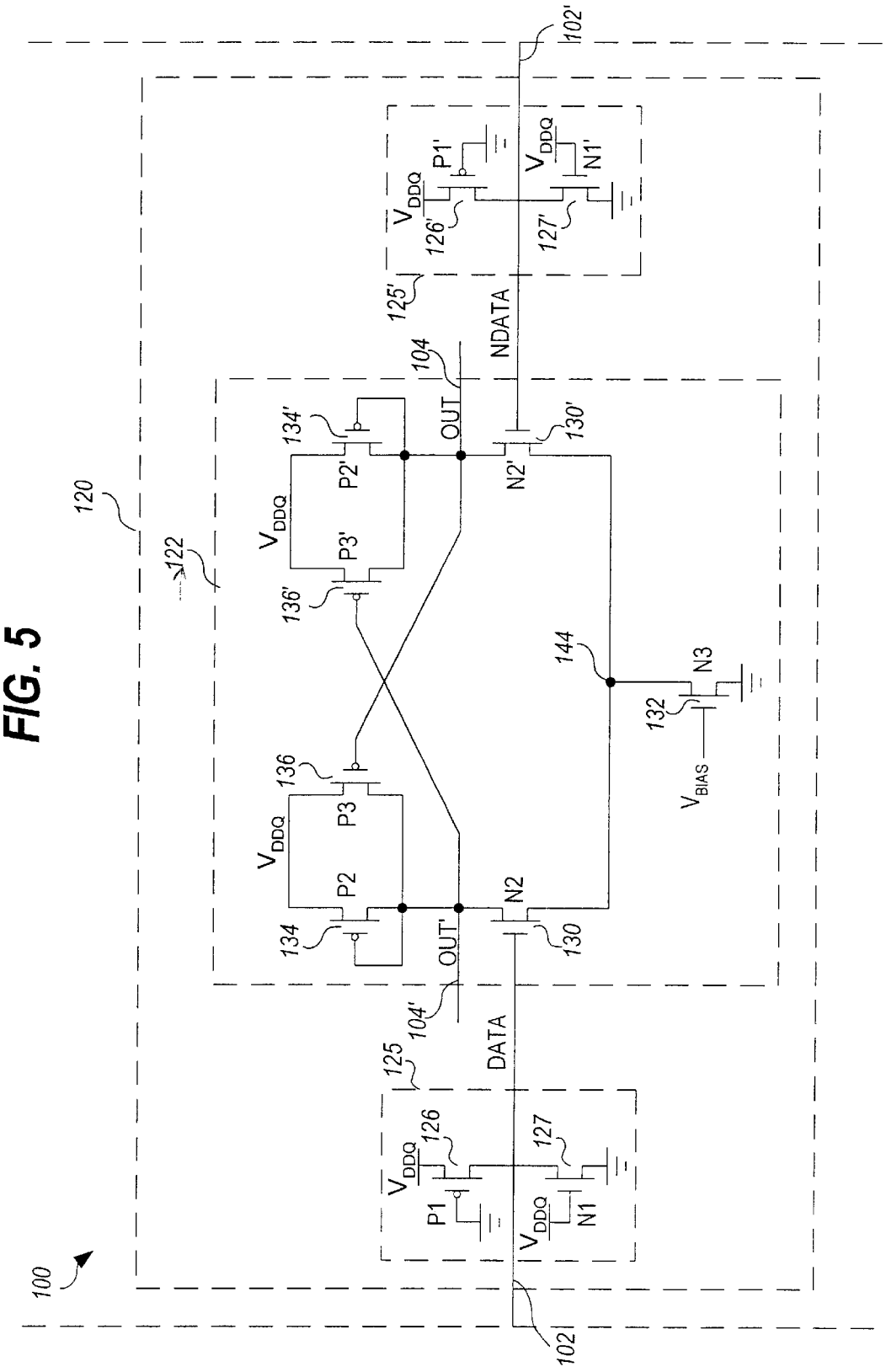
FIG. 5 is a schematic diagram of a preferred embodiment of the terminating receiver of the invention.

FIG. 5 is a more detailed schematic diagram of the terminated differential receiver 120 implemented in accordance with the preferred embodiment of the invention. As illustrated, the differential receiver 122 comprises a pair of input NFETs 130, 130', each having a gate connected to receiver input lines 102, 102' to receive differential input signals DATA and DATA', and a drain connected to opposite output lines 104 and 104' respectively. The sources of NFETs 130, 130' are tied together at node 144, which is connected to a current source implemented by NFET 132. A signal $V_{BIAS}$ controls the current flow through NFET 132.

A pair of PFETs 134, 136 are connected in parallel in source-drain relationship between voltage source $V_{DDQ}$ and output line 104'. The gate of PFET 134 is connected to differential output line 104'. The gate of PFET 136 is connected to output line 104 on which output signal OUT is presented. A matching pair of PFETs 134', 136' are connected in parallel in source-drain relationship between voltage source $V_{DDQ}$ and output line 104 on which differential output signal OUT' is presented. The gate of PFET 134' is connected to output line 104. The gate of PFET 136' is connected to differential output line 104'.

Termination circuits 125, 125' are respectively connected to differential input lines 102, 102' (as described with respect to FIG. 4) having respective impedances that match the characteristic impedance $Z_0$, $Z_0'$ of respective transmission lines 112, 112'.

In this design, all PFETs 126, 126', 134, 134', 136, 136' (P1, P1', P2, P2', P3, P3') and NFETs 127, 127', 130, 130', 132 (N1, N1', N2, N2', N3) have the same transistor gate lengths to allow similar variation with respect to PVT. In the termination circuits 125, 125', the PFETs 126, 126' (P1, P1') and NFETs 127, 127' (N1, N1') are sized with equal drive strengths and are balanced to create a voltage divider at the differential input lines 102, 102' equal to $V_{DDQ}/2$ under nominal conditions. The receiver PFETS 134/136, 134'/136' (P2/P3, P2'/P3') and NFETs 130, 130', 132 (N2, N2', N3) are also preferably balanced to work optimally under nominal conditions. Accordingly, the receiver 122 FETs are sized to have the same ratios of the FETs in the termination circuits 125, 125', with the differential pair NFETs 130, 130' (N2, N2') being comparatively large to introduce minimal additional resistance.

In the nominal case, the terminating receiver circuit 120 performs optimally as long as the circuit is designed such that its common mode performance is optimized to operate at $V_{DDQ}/2$, which is the common-mode voltage generated by the termination scheme. In the case where PVT variation causes the PFETs 126, 126', 134, 134', 136, 136' (P1, P1', P2, P2', P3, P3') to have a higher drive strength than the NFETs 127, 127', 130, 130', 132 (N1, N1', N2, N2', N3), the termination circuit 125, 125' of the terminating receiver circuit 120 will shift the input signal DATA, DATA' from $V_{DDQ}/2$ to a higher voltage $V_{DDQ}/2+\Delta V$. The common-mode optimal performance range of the differential receiver 122 will also shift up for the same reason, allowing the circuit to remain in its optimal operating range. In the case where PVT variation causes the NFETs 127, 127', 130, 130', 132 (N1, N1', N2, N2', N3) to have a higher drive strength than the PFETs 126, 126', 134, 134', 136, 136' (P1, P1', P2, P2', P3, P3'), the termination circuit 125, 125' of the terminating receiver circuit 120 will shift from $V_{DDQ}/2$ to a lower voltage $V_{DDQ}/2-\Delta V$. The common-mode optimal performance range of the differential receiver 122 will shift down in voltage also, again allowing the circuit to remain in its optimal operating range.

Figure 6A:
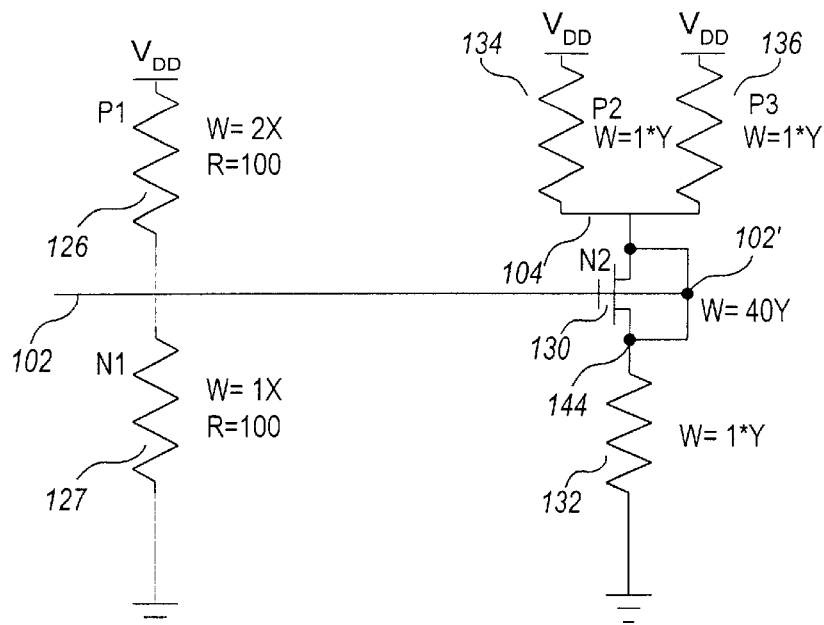
FIG. 6A is a circuit model diagram of the terminating receiver circuit of FIG. 4.
Figure 6B:
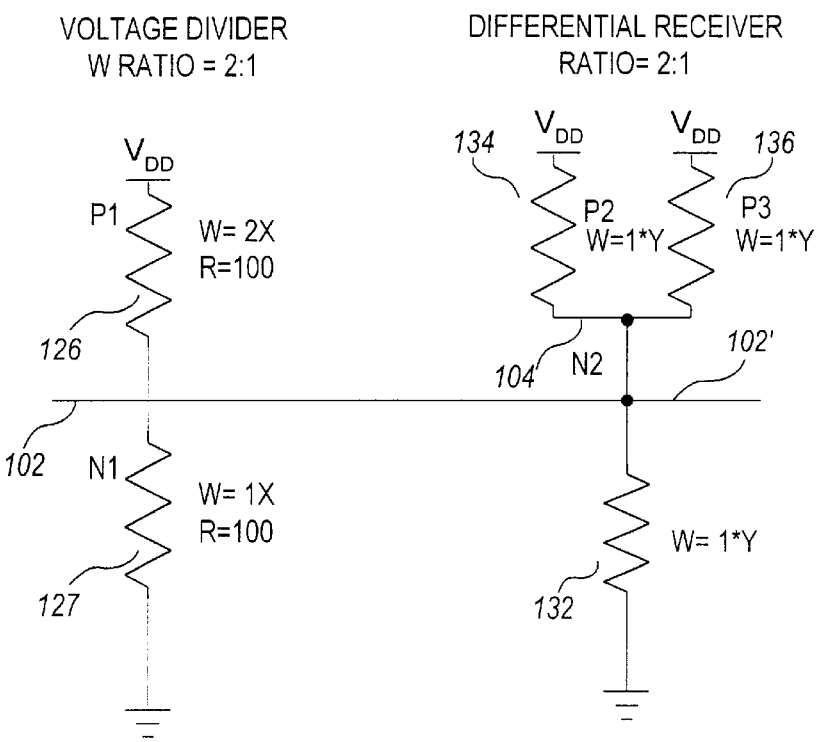
FIG. 6B is a collapsed circuit model diagram of the circuit model of FIG. 6A.

FIGS. 6A and 6B illustrate a circuit model diagram of the terminating receiver circuit of FIG. 4 illustrating the effect of PVT variation on the performance of the terminated receiver circuit of the invention. As illustrated, the terminating FETs 126 (P1) and 127 (N1), diode-connected PFETs 134, 136 (P2, P3), and biasing current source FET 132 (N3) are each represented as resistors. As noted previously, the gate lengths of all PFETs in the terminating circuit 16 and receiver circuit 18 must be identical to one another, and the gate lengths of all NFETs in the terminating circuit 16 and receiver circuit 18 must also be identical to one another, in order for the receiver circuit 18 to track PVT variations. Accordingly, ratio relationships between the transistors in the receiver circuit 18 and termination circuit 16 are achieved by varying the gate width of the transistors.

For illustration, FIG. 6A shows that termination circuit FETs 126 and 127 are sized such that the transistor gate of PFET 126 (P1) is 2*X to achieve a resistance value $R_1$ of 100 Ohms when the input voltage on line 102 is $V_{DDQ}/2$ and the transistor gate of NFET 127 (N1) is 1*X to achieve a resistance value $R_2$ of 100 Ohms when the input voltage on line 102 is $V_{DDQ}/2$. FIG. 6 also shows that diode-connected PFETs 134, 136 (P2, P3) are each sized to have gate width of 1*Y. Because they are in parallel, the two diode-connected PFETs 134, 136 (P2, P3) are equivalent to one PFET with a gate width of 2*Y. Biasing NFET 132 (N3) is shown sized to have gate width of 1*Y.

Since NFET 130 (N2) is typically sized comparatively larger than the other receiver FETs 134, 134', 136, 136', 132 in order to introduce minimal resistance. In the illustrative example, NFETs 130 and 130' are sized such that their respective resistances are 40 times smaller; accordingly, for circuit model purposes, NFET 130 and NFET 130' are each replaced by a wire, as shown in FIG. 6B.

Accordingly, nodes 102 and 102' will have the same voltage level. If the gate length ratios between the PFETs and NFETs of the circuit change due to process, voltage, or temperature variations, the PFETs in the receiver circuit 16 will change in the same ration as the PFETs in the receiver circuit 18; likewise, the NFETs in the receiver circuit 16 will change in the same ration as the NFETs in the receiver circuit 18. Accordingly, both nodes 102 and 102' will be affected in the same manner, and therefore the common-mode voltage of the receiver circuit 122 moves up or down depending on how the PVT variation is skewed. For example, in the case that the PFETs are skewed with lower resistance $R_1$ than the resistance $R_2$ of the NFETs ("fast" PFETs and "slow" NFETs, the variation results in more current flowing through the PFETs than through the NFETs. Accordingly, the common mode voltage will be above the nominal common mode voltage $V_{DDQ}/2$. A shift in common mode voltage due to PVT variation is normally a problem that must be compensated for, resulting in additional compensation circuitry. However, because all PFETs and NFETs are sized to have identical transistor gate lengths, if the nominal input voltage $V_{DDQ}/2$ of differential input signals DATA, DATA' is skewed by an amount $\pm\Delta V$, the optimal common-mode operating point of differential receiver 122 is skewed by the same amount $\pm\Delta V$ in the same direction and therefore the receiver 122 detects the signal crossing point within the logic standard's specified range (e.g., $0.68V\pm\Delta V$ to $0.90V\pm\Delta V$ for HSTL).

It will be appreciated by those skilled in the art that this methodology may be employed in various differential receiver designs so long as PFETs and NFETs are both used, and so long as the sizing ratios between the PFETs and NFETs in the differential receiver 122 are determined to vary similarly to the termination circuit 125, 125' with respect to PVT variations.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A terminating receiver for an integrated circuit and connectable to a transmission line characterized by a transmission line characteristic impedance, comprising:

a differential receiver having a receiver input connectable to said transmission line, said differential receiver comprising at least one n-channel transistor and at least one p-channel transistor;

a termination circuit connected to said receiver input in parallel with said transmission line, said termination circuit characterized by a termination impedance substantially equal to said transmission line characteristic impedance and comprising at least one p-channel transistor and at least one n-channel transistor;

wherein said at least one p-channel transistor of said differential receiver and said at least one p-channel transistor of said termination circuit are ratio to vary similarly under process, voltage, temperature (PVT) variation, and said at least one n-channel transistor of said differential receiver and said at least one n-channel transistor of said termination circuit are ratio to vary similarly under PVT variation.

2. A terminating receiver in accordance with claim 1, wherein:

said at least one p-channel transistor of said differential receiver and said at least one p-channel transistor of said termination circuit comprise substantially equal transistor gate lengths; and said at least one n-channel transistor of said differential receiver and said at least one n-channel transistor of said termination circuit comprise substantially equal transistor gate lengths.

3. A terminating receiver in accordance with claim 1, wherein:

said termination circuit comprises:

at least one p-channel transistor, each said at least one p-channel transistor having a source coupled to a first voltage source, a gate coupled to a second voltage source, and a drain coupled to said transmission line, wherein said at least one p-channel transistors together model a first resistance between said first voltage source and said transmission line; and at least one n-channel transistor, each said at least one n-channel transistor having a source coupled to said second voltage source, a gate coupled to said first voltage source, and a drain coupled to said transmission line, wherein said at least one n-channel transistors together model a second resistance between said second voltage source and said transmission line;

wherein a parallel combination of said first resistance and said second resistance matches said transmission line characteristic impedance.

4. A terminating receiver circuit in accordance with claim 3, wherein:

said p-channel transistor and said n-channel transistor are sized such that said parallel combination of said first resistance and said second resistance matches said transmission line characteristic impedance when said transmission line is at a predetermined nominal reference voltage.

5. A terminating receiver circuit in accordance with claim 3, wherein said differential receiver comprises:

an input n-channel transistor having a gate connected to receive a receiver input signal, an input n-channel transistor source connected to a biased node, and an input n-channel transistor drain connected to a complementary output node;

a differential input n-channel transistor having a gate connected to receive a complementary receiver input signal, a differential input n-channel transistor source connected to said biased node, and a differential input n-channel transistor drain connected to an output node;

a p-channel transistor having a source connected to said first voltage source, a drain connected to said complementary output node, and a gate connected to said output node;

a complementary p-channel transistor having a source connected to said first voltage source, a drain connected to said output node, and a gate connected to said complementary output node; and a biasing n-channel transistor having a source connected to said second voltage source, a drain connected to said biasing node, and a gate connected to receive a biasing reference voltage.

6. A terminating receiver in accordance with claim 2, wherein:

said termination circuit comprises:

at least one p-channel transistor, each said at least one p-channel transistor having a source coupled to a first voltage source, a gate coupled to a second voltage source, and a drain coupled to said transmission line, wherein said at least one p-channel transistors together model a first resistance between said first voltage source and said transmission line; and at least one n-channel transistor, each said at least one n-channel transistor having a source coupled to said second voltage source, a gate coupled to said first voltage source, and a drain coupled to said transmission line, wherein said at least one n-channel transistors together model a second resistance between said second voltage source and said transmission line;

wherein a parallel combination of said first resistance and said second resistance matches said transmission line characteristic impedance.

7. A terminating receiver circuit in accordance with claim 6, wherein:

said p-channel transistor and said n-channel transistor are sized such that said parallel combination of said first resistance and said second resistance matches said transmission line characteristic impedance when said transmission line is at a predetermined nominal reference voltage.

8. A terminating receiver circuit in accordance with claim 2, wherein said differential receiver comprises:

an input n-channel transistor having a gate connected to receive a receiver input signal, an input n-channel transistor source connected to a biased node, and an input n-channel transistor drain connected to a complementary output node;

a differential input n-channel transistor having a gate connected to receive a complementary receiver input signal, a differential input n-channel transistor source connected to said biased node, and a differential input n-channel transistor drain connected to an output node;

a p-channel transistor having a source connected to said first voltage source, a drain connected to said complementary output node, and a gate connected to said output node;

a complementary p-channel transistor having a source connected to said first voltage source, a drain connected to said output node, and a gate connected to said complementary output node; and a biasing n-channel transistor having a source connected to said second voltage source, a drain connected to said biasing node, and a gate connected to receive a biasing reference voltage.

9. A method for terminating a transmission line connectable to an integrated circuit, said transmission line characterized by a transmission line characteristic impedance, comprising:

providing a differential receiver having a receiver input connectable to said transmission line and comprising at least one n-channel transistor and at least one p-channel transistor;

providing a termination circuit connected to said receiver input in parallel with said transmission line, said termination circuit comprising at least one p-channel transistor and at least one n-channel transistor and characterized by a termination impedance equal to said transmission line characteristic impedance;

wherein said at least one p-channel transistor of said differential receiver and said at least one p-channel transistor of said termination circuit are ratio to vary similarly under PVT variation, and said at least one n-channel transistor of said differential receiver and said at least one n-channel transistor of said termination circuit are ratio to vary similarly under PVT variation.

10. A method in accordance with claim 9, comprising:

implementing said at least one p-channel transistor of said differential receiver and said at least one p-channel transistor of said termination circuit with substantially equal transistor gate lengths; and implementing said at least one n-channel transistor of said differential receiver and said at least one n-channel transistor of said termination circuit with substantially equal transistor gate lengths.

11. A method in accordance with claim 9, wherein said providing said termination circuit step comprises:

providing at least one p-channel transistor, each said at least one p-channel transistor having a source coupled to a first voltage source, a gate coupled to a second voltage source, and a drain coupled to said transmission line, wherein said at least one p-channel transistors together model a first resistance between said first voltage source and said transmission line; and providing at least one n-channel transistor, each said at least one n-channel transistor having a source coupled to said second voltage source, a gate coupled to said first voltage source, and a drain coupled to said transmission line, wherein said at least one n-channel transistors together model a second resistance between said second voltage source and said transmission line;

wherein a parallel combination of said first resistance and said second resistance matches said transmission line characteristic impedance.

12. A method in accordance with claim 11, comprising:

sizing said p-channel transistor and said n-channel transistor such that said parallel combination of said first resistance and said second resistance matches said transmission line characteristic impedance when said transmission line is at a predetermined nominal reference voltage.

13. A method in accordance with claim 10, wherein said providing said termination circuit step comprises:

providing at least one p-channel transistor, each said at least one p-channel transistor having a source coupled to a first voltage source, a gate coupled to a second voltage source, and a drain coupled to said transmission line, wherein said at least one p-channel transistors together model a first resistance between said first voltage source and said transmission line; and providing at least one n-channel transistor, each said at least one n-channel transistor having a source coupled to said second voltage source, a gate coupled to said first voltage source, and a drain coupled to said transmission line, wherein said at least one n-channel transistors together model a second resistance between said second voltage source and said transmission line;

wherein a parallel combination of said first resistance and said second resistance matches said transmission line characteristic impedance.

14. A method in accordance with claim 13, comprising:

sizing said p-channel transistor and said n-channel transistor such that said parallel combination of said first resistance and said second resistance matches said transmission line characteristic impedance when said transmission line is at a predetermined nominal reference voltage.

\* \* \* \* \*